US008045838B2

(12) United States Patent
Masuo et al.

(10) Patent No.: US 8,045,838 B2
(45) Date of Patent: Oct. 25, 2011

(54) VIDEO VIEWING APPARATUS, VIDEO PLAY BACK CONTROL METHOD, AND RECORDING/PLAY BACK PROGRAM

(75) Inventors: Yoko Masuo, Iruma (JP); Takahisa Kaihotsu, Musashino (JP); Shingo Kikukawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/608,909

(22) Filed: Oct. 29, 2009

(65) Prior Publication Data
US 2010/0178034 A1 Jul. 15, 2010

(30) Foreign Application Priority Data

Jan. 15, 2009 (JP) ................................. 2009-006804

(51) Int. Cl.
*H04N 5/77* (2006.01)
(52) U.S. Cl. ........................................ 386/224; 386/343
(58) Field of Classification Search .................. 386/224, 386/242, 278, 326, 343, 223, 328
See application file for complete search history.

(56) References Cited

U.S. PATENT DOCUMENTS

| 5,333,061 A * | 7/1994 | Nakashima et al. | 386/264 |
| 7,343,084 B2 * | 3/2008 | Kishi et al. | 386/343 |

FOREIGN PATENT DOCUMENTS

| JP | 63-106475 | 5/1988 |
| JP | 08-182786 A | 7/1996 |
| JP | 08-215177 | 8/1996 |
| JP | 10-032754 | 2/1998 |
| JP | 10-3742701 B2 | 8/1998 |
| JP | 2001-134767 | 5/2001 |
| JP | 2006-252356 | 9/2006 |
| JP | 2006-255329 A | 9/2006 |
| JP | 2006-302122 A | 11/2006 |
| JP | 2007-316971 A | 12/2007 |

OTHER PUBLICATIONS

"PowerDirector4"; PCfan; Mainichi Communications Co., Ltd.; May 1, 2005; vol. 12, No. 8, p. 126.
Yuki Kaneko et al; "Effective inspection technique of video in folk dance study"; Graphics and CAD; Aug. 23, 2008; vol. 2008; No. 80; 2008-CG-132(17); pp. 87-92.
Japanese Office Action dated Jan. 5, 2010, Japanese Patent Application No. JP-2009-006804.

* cited by examiner

*Primary Examiner* — Robert Chevalier
(74) *Attorney, Agent, or Firm* — Patterson & Sheridan, LLP

(57) ABSTRACT

According to one embodiment of the present invention, an instructor's exercise image data is compared with a user's exercise image data. A personal video of a viewer who is viewing a master video is acquired by an imaging module. An image motion period determination module determines a series of image motion periods of the master video and the personal video. A motion characteristic amount acquisition module acquires motion characteristic amounts from image motion parts. A motion characteristic amount comparison module compares a motion characteristic amount of the maser video with that of the personal video. A storage module stores information corresponding to a frame having a large difference in motion characteristic amount. A disclosure module reproduces the frames of the master video and the personal video based on the stored information at the time of play back and outputs the reproduced frames.

7 Claims, 8 Drawing Sheets

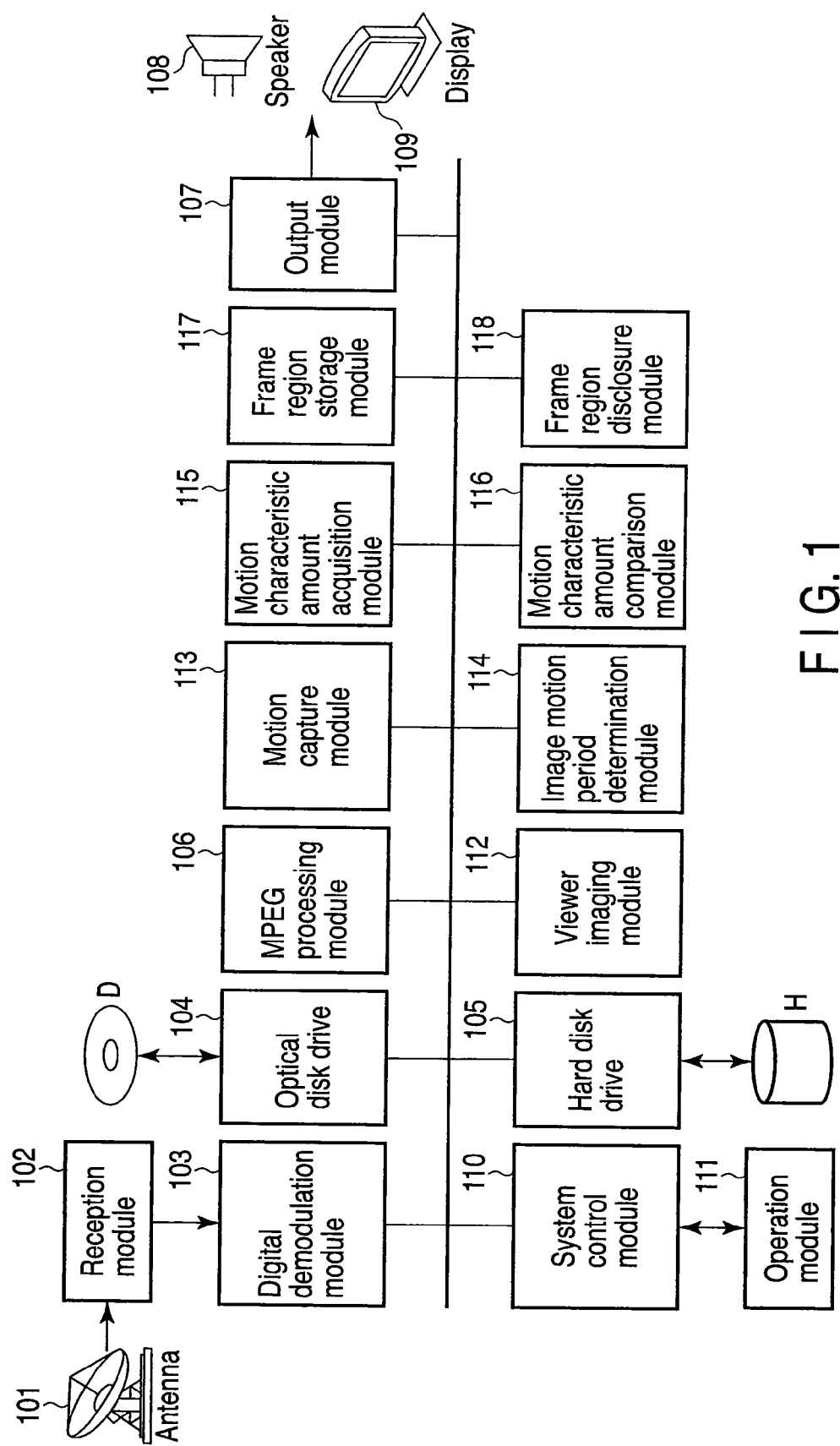
F I G. 1

US 8,045,838 B2

VIDEO VIEWING APPARATUS, VIDEO PLAY BACK CONTROL METHOD, AND RECORDING/PLAY BACK PROGRAM

CROSS-REFERENCE TO RELATED APPLICATIONS

This application is based upon and claims the benefit of priority from Japanese Patent Application No. 2009-006804, filed Jan. 15, 2009, the entire contents of which are incorporated herein by reference.

BACKGROUND

1. Field

One embodiment of the invention relates to a video viewing apparatus, a video play back control method, and a recording/play back program, and can be applied to, e.g., a digital television having a recording/play back function for video content. In particular, it is very effective that to apply the embodiment of the invention to an application when executing image processing is executed based on intensive arithmetic performance.

2. Description of the Related Art

In a user's terminal, there is an apparatus that temporally synchronizes the user's exercise moving image data acquired by a camera with an instructor's exercise image data from the instructor's terminal to form one screen and displays it in a display (e.g., JP-A 2006-302122 [KOKAI]). According to the technology of this Patent Document 1, the user's exercise image data and the instructor's exercise image data subjected to CG processing are compared with each other in accordance with each monitoring target region concurrently with the display operation, thereby detecting a motion difference. Further, if the motion difference exceeds a determination threshold value, an alarm sound is output from a speaker.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a view showing a structural example of a video viewing apparatus according to an embodiment of the present invention;

DETAILED DESCRIPTION

Various embodiments according to the invention will be described hereinafter with reference to the accompanying drawings.

In an embodiment according to the present invention, for example, if an instructor's exercise image data is compared with a user's exercise image data and motion difference information of both the pieces of data is detected, an image which is more comprehensible to the user can be provided.

The embodiment according to the present invention has an imaging module that obtains a personal video by imaging a viewer who is watching a master video and an image motion period determination module that determines a series of image motion periods of the master video and the personal video. A motion characteristic amount acquisition module acquires a motion characteristic amount from an image motion part of each frame in the series of image motion periods. A motion characteristic amount comparison module compares a motion characteristic amount of the master video with that of the personal video. A storage module stores information associated with a frame having a large difference in the motion characteristic amount revealed by the comparison. A disclosure module reproduces frames of the master video and the personal video based on the information stored at the time of play back and outputs the reproduced frames to a display module.

According to the embodiment, a part of the master video and a part of the personal video which have a large difference in motion can be compared with each other as realistic images to be displayed. As a result, the viewer can precisely determine a part of the master video and a part of sub-content which has a difference in motion.

Figure 2:
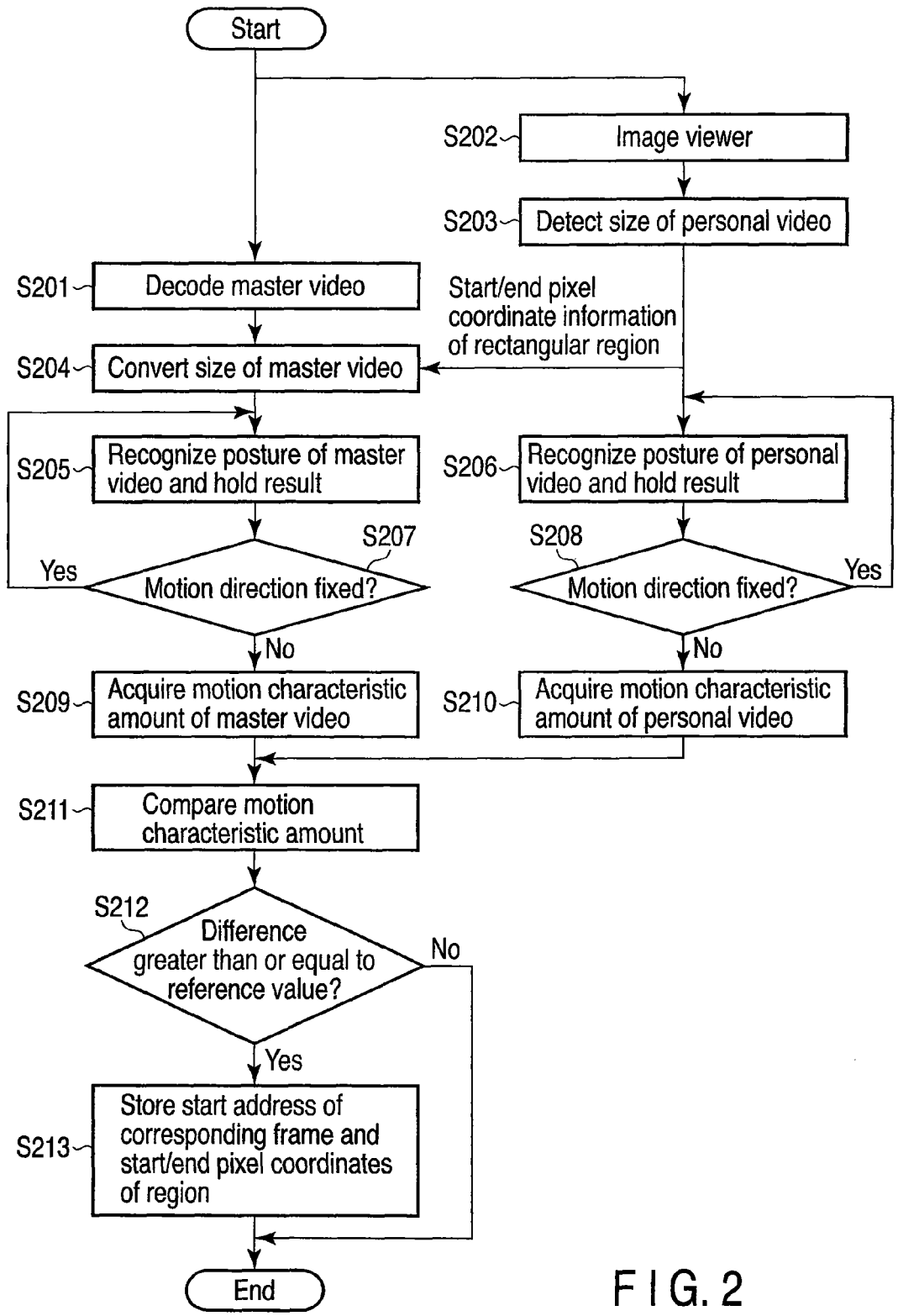
FIG. 2 is a flowchart showing an operational example of the apparatus according to the present invention when a personal video is recorded.
Figure 3:
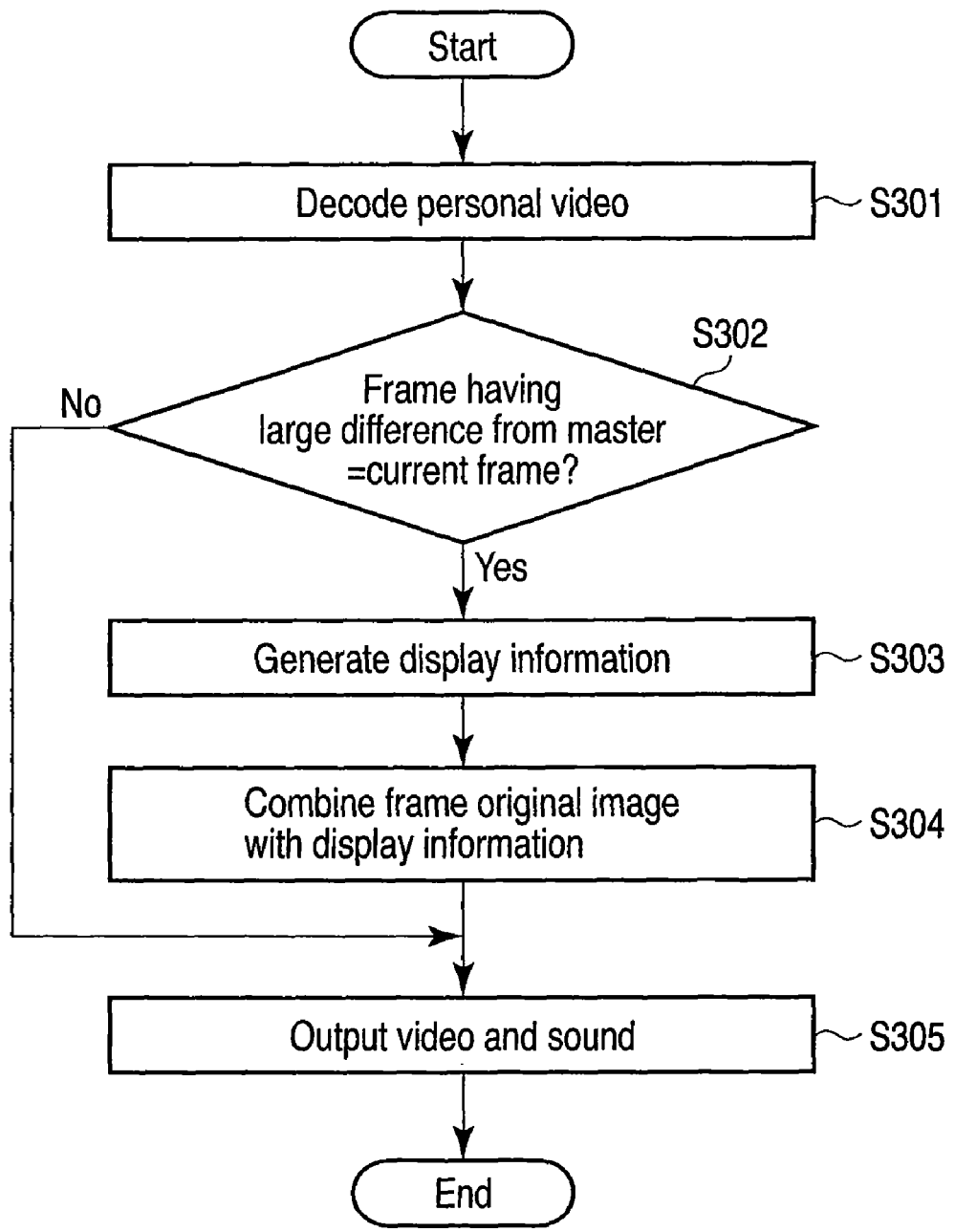
FIG. 3 is a flowchart showing an operational example of the apparatus according to the present invention when a master video and a personal video are reproduced.
Figure 4:
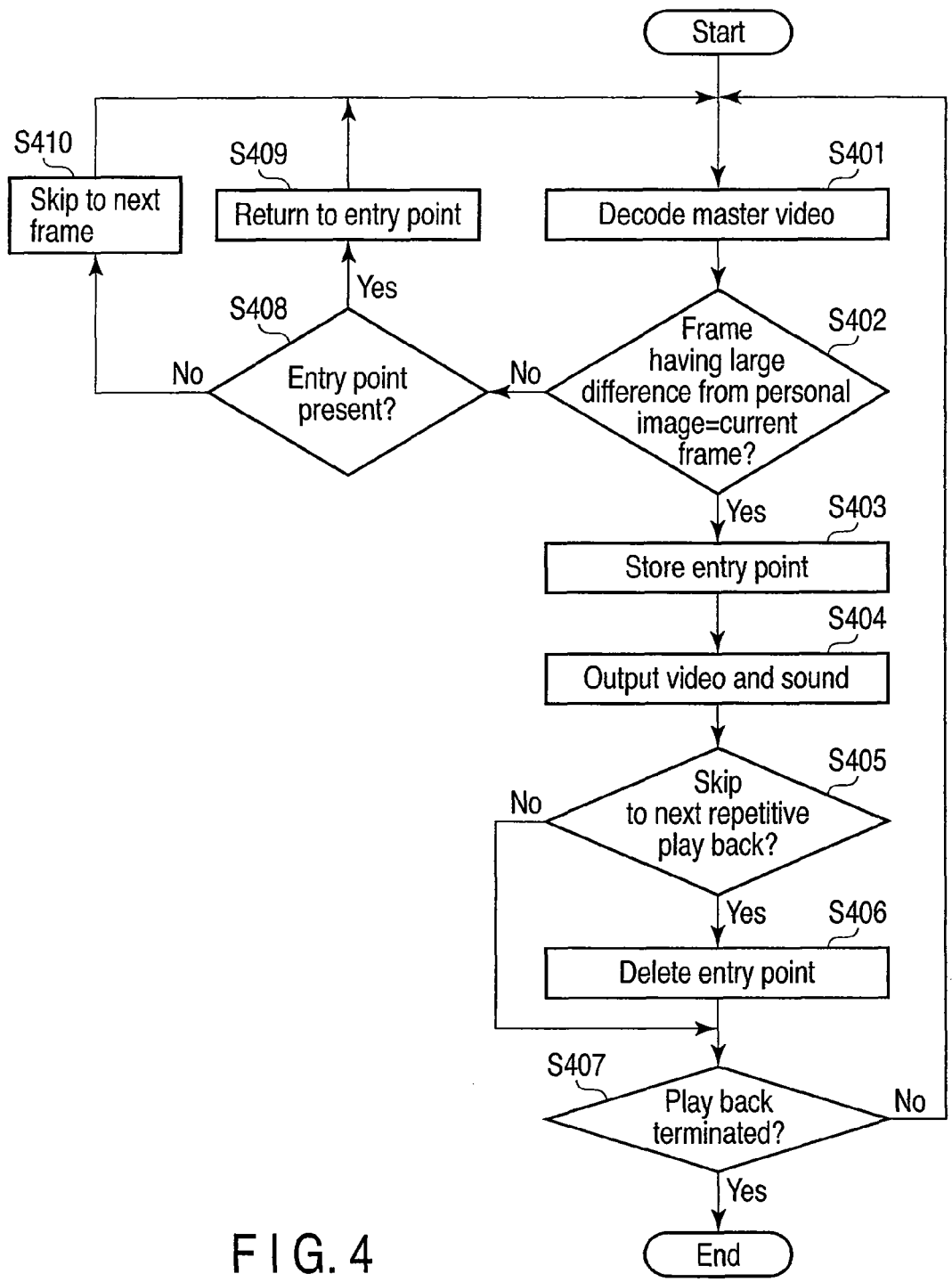
FIG. 4 is a flowchart showing another operational example of the apparatus according to the present invention when a master video and a personal video are reproduced.
Figure 5:
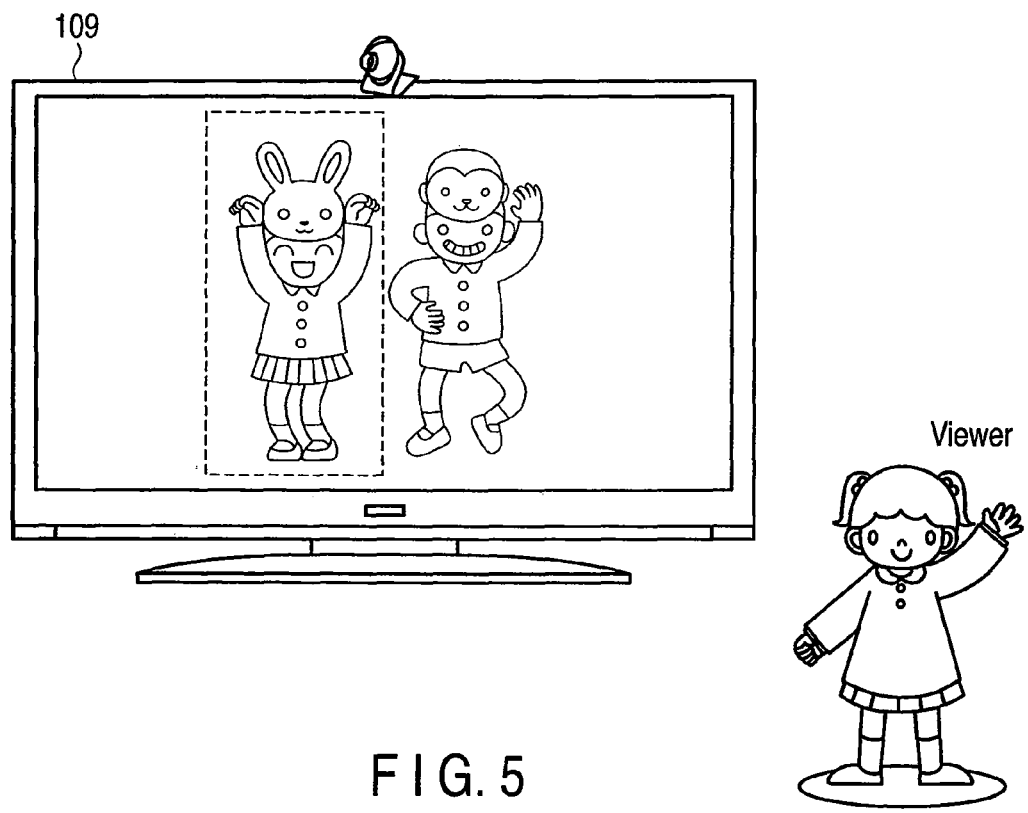
FIG. 5 is a view showing a display example of a display module in the apparatus according to the present invention when the personal video is acquired.
Figure 6:
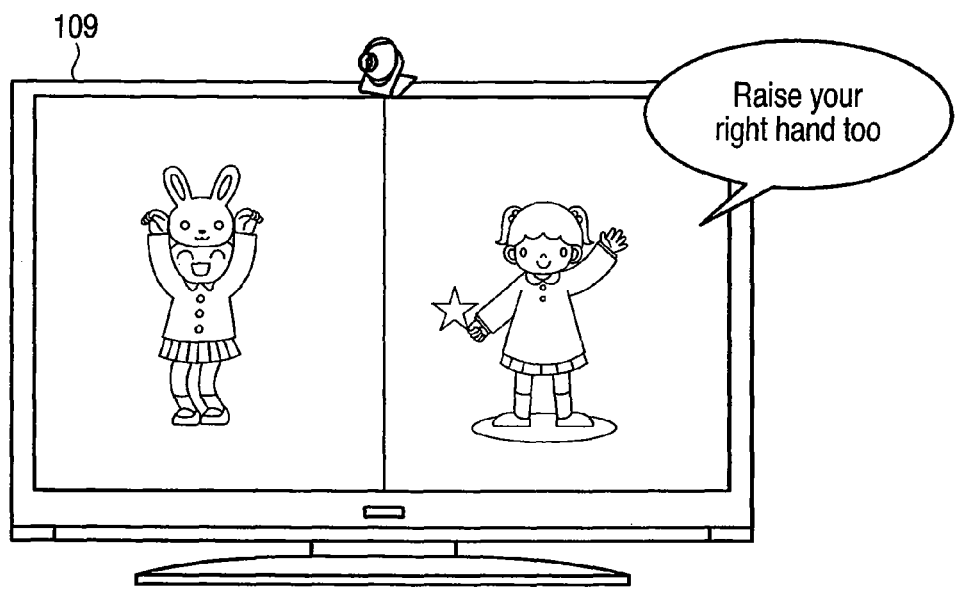
FIG. 6 is a view showing another display example of play back content in the display module in the apparatus according to the present invention.

A more specific description will now be given. A structure of an entire video viewing apparatus according to the present invention will now be described with reference to FIG. 1. FIGS. 2, 3, and 4 illustrate operational examples, FIG. 5 shows a state where the viewer watches a master video and a personal video is acquired, and FIG. 6 illustrates a display example when the personal video is reproduced.

FIG. 1 is a view showing a structural example of the entire video viewing apparatus according to the present invention. A television broadcast signal received by a reception module 102 by means of an antenna 101 is temporarily converted into an intermediate frequency (IF) signal. A digital demodulation module 103 extracts a digital signal (transport stream [TS] signal) from the IF signal. The TS signal is input to an MPEG processing module 106. The MPEG processing module 106 divides the TS signal into video, audio, and service information (SI) for EPG display to decode the video and audio.

The decoded video data and audio data are output to a display 109 and a speaker 108 from an output module 107, respectively.

A system control module 110 is a processing module that collectively controls operations of the respective processing modules. Furthermore, this system control module 110 receives various kinds of control commands issued from an external operation module 111 such as a remote controller. The control command is, e.g., a command that instructs to record a television broadcast or to reproduce recorded content. When a television broadcast recording instructing command is issued, received broadcast content is encoded by the MPEG processing module 106 and recorded on an optical disk D by means of an optical disk drive 104 or on a hard disk H by means of a hard disk drive 105.

On the other hand, when a play back instructing command is issued with respect to recorded content on the optical disk D or the hard disk H, the content is read from the optical disk D or the hard disk H. The read content is decoded by the MPEG processing module 106 and then output to the output module 107.

The above describes a basic structure of the video viewing apparatus. On the other hand, the apparatus according to the present invention includes a viewer imaging module 112, a motion capture module 113, an image motion period determination module 114, a motion characteristic amount acquisition module 115, a motion characteristic amount comparison module 116, a frame region storage module 117, and a frame region disclosure module 118.

The system control module 110 is connected with the digital demodulation module 103, the optical disk drive 104, the hard disk drive 105, the MPEG processing module 106, the output module 107, the viewer imaging module 112, the motion capture module 113, the image motion period determination module 114, the motion characteristic amount acquisition module 115, the motion characteristic amount comparison module 116, the frame region storage module 117, and the frame region disclosure module 118 by means of a digital signal bus.

The viewer imaging module 112 is a processing module which images a state in which the viewer watches a master video and includes a camera. The viewer imaging module 112 may be simply referred to as an imaging module. The motion capture module 113 analyzes a personal video which is acquired by imaging the viewer with the viewer imaging module 112 and a master video as a master video which is being watched. Moreover, the motion capture module 113 specifies a posture in, e.g., a portrait in frames. It is to be noted that the present invention does not have to be restricted to the portrait and specifying a predetermined posture in a motion image part is enough. An object part which should be identified may be specified by using, e.g., a cursor.

The image motion period determination module 114 sequentially compares a preceding frame and a following frame based on posture information specified by the motion capture module 113 and determines a continuous frame period in which an image is moving in a fixed direction in macro blocks (MBs) as a breakpoint of a series of operations.

The motion characteristic amount acquisition module 115 regularizes a sum total of motion vector values in a series of operation periods to calculate a motion characteristic amount. The motion characteristic amount comparison module 116 compares a motion characteristic amount of the master video with that of the personal video obtained by imaging the viewer. If the difference between the motion characteristic amount of the master video and that of the personal video exceeds a predetermined reference value, information required to specify a corresponding frame and a region is supplied to the frame region storage module 117. This information is indicative of, e.g., a start address of a frame or a pixel coordinate of a region.

The frame region storage module 117 stores the received information. The frame region disclosure module 118 is a processing module which discloses the region information and others to the viewer when play back the frame stored in the frame region storage module 117. Specifically, it selectively executes items 1 to 3, below, or executes combinations of these items.

(1) An image such as a mark or a caption indicative of a corresponding region (e.g., characters such as "caution" or an arrow mark) is generated and combined with an original image in the output module 107 to be displayed. Alternatively, a part having large motion displacement may be displayed in a specific color. As a result, the part with large motion displacement can be readily visually recognized. (2) A stored continuous frame period is controlled to be automatically repeatedly reproduced. (3) The frame region storage module may have a function of automatically performing editing to cut the stored storage frame period alone. As a result, parts having normal motions in the master video and the personal video can be continuously reproduced. The cutting processing may be executed when simultaneously play back the master video and the personal video, or the master video and the personal video subjected to cutting processing may be recorded as content in a recording medium to be managed in association with each other.

Based on the above-described structure, it is possible to provide the video viewing apparatus that can compare the master video with the personal video in units of a series of operations and recognize a scene having a large difference in image motion, and automatically support repetitive practice or editing. In this case, since the viewer watches a scene having a large image motion difference in an actual video, this difference can be very easily recognized. Furthermore, each part of an image sectioned in units of a series of operations is subjected to image processing, which is efficient. That is, redundant image processing can be reduced.

It is to be noted that the play back module includes three systems in this apparatus. First, there is a system in which content recorded on the optical disk D is read by the optical disk drive 104 and then decoded by the MPEG processing module 106 and the decoded content is output by means of the output module 107. Further, there is a system in which content recorded on the hard disk K is read by the hard disk drive 105 and then decoded by the MPEG processing module 106 and the decoded content is output by means of the output module 107. Furthermore, there is a system in which broadcast content received by the reception module 102 is demodulated by the digital demodulation module 103 and then decoded by the MPEG processing module 106 and the decoded content is output by means of the output module 107.

Moreover, the recording module includes the following four systems and combinations thereof. There is a system in which received broadcast content is demodulated by the digital demodulation module 103 and then encoded by the MPEG processing module 106 and the encoded content is recorded on the optical disk D by means of the optical disk drive 104 or a system in which the encoded content is recorded on the hard disk H by means of the hard disk drive 105. Additionally, there is a system in which content imaged by the viewer imaging module 112 is encoded by the MPEG processing module 106 and the encoded content is recorded on the optical disk D by means of the optical disk drive 104 or a system in which the encoded content is recorded on the hard disk H by means of the hard disk drive 105.

An example of a comparison processing operation for a master video and a personal video in the apparatus according to the present invention will now be described with reference to FIG. 2. Steps S205 and S206 correspond to core processing (posture analysis based on marker less motion capture) of the motion capture module 113.

A wide range of applications of the motion capture technology, e.g., the production of computer graphics (CG) content or interface applications for computers or games is considered. Various kinds of markers or sensors which are of a magnetic type, a mechanical type, or an optical type must be attached to each region of a body in the conventional technology, but studies of "marker less motion capture technology" which estimates a posture of a person from a two-dimensional image acquired by a video camera are conducted in recent years. As typical techniques, there are a tracking technique, a template matching technique, a posture analysis technique, and others. In June 2007, a case that the template matching technique is combined with the tracking technique and the high arithmetic performance of Cell is utilized to realize a real-time markerless motion capture system was released (research paper "Markerless Motion Capture using Cell Broadband Engine (registered trademark)" issued by Toshiba Corporation, Toshiba Review Vol. 62. 2007).

In step S201, the MPEG processing module 106 decodes and reproduces a master video as a viewing target. In step S202, the viewer imaging module 112 images the viewer who is watching the master video simultaneously with the processing in step S201. A video picture of the viewer obtained by this imaging is called a personal video. FIG. 5 shows how the viewer watches the master video and how the personal video is acquired.

In step S203, as preprocessing in the motion capture module 113, the personal video and the master video are converted into the same size to facilitate comparison. In step S203, size information of the personal video required for the conversion is detected. Specifically, for example, the personal video is detected in a rectangular region, and start/end pixel coordinates thereof are acquired.

In step S204, a comparison target region of the master video is compressed or expanded to have the same size as the personal video based on the size information of the personal video acquired in step S203. It is to be noted that steps S203 and S204 are not necessarily required processing, and the comparison may be facilitated by, e.g., adding means for inputting respective body shape models of the master video and the personal video from the outside.

In step S205, based on the motion capture technology, the posture recognition of the master video is performed in frames, and the result is held. In step S206, based on the motion capture technology, the posture recognition of the personal video is performed in frames, and the result is held.

In step S207, the image motion period determination module 114 sequentially compares a preceding frame and a subsequent frame based on the posture information of the master video specified in step S205, and confirms whether an image is moving in a fixed direction in MBs. A continuous frame period in which the image moves in the fixed direction is determined as a breakpoint of a series of operations, and processing in steps S205 and S207 is repeated in this period.

It is to be noted that, if a motion vector in units of MBs is acquired to estimate a posture in step S205, this information is held in step S205 and utilized at this step. Furthermore, in regard to an MB dividing method, an increase in speed and in accuracy of the processing may be achieved by cutting out a torso part as a large region and a part corresponding to each of four limbs as a small region in units of joint, for example.

In step S208, based on the posture information of the personal video specified in step S206, the same determination as that in step S207 is made, and the processing of steps S206 and S208 is repeatedly performed in the series of operation periods.

In step S209, the motion characteristic amount acquisition module 115 regularizes a motion vector sum total in MBs based on the posture information in the continuous frame period held in step S205, thereby calculating a motion characteristic amount of the master video.

In step S210, the motion characteristic amount acquisition module 115 regularizes a motion vector sum total in MBs based on the posture information in the continuous frame period held in step S205, thereby calculating a motion characteristic amount of the personal video.

In step S211, the motion characteristic amount comparison module 116 compares the motion characteristic amounts calculated in steps S209 and S210 with each other. At the next step S212, whether a difference between these motion characteristic amounts falls within a range of a reference value as a result of the process in step S211 is determined.

In step S213, if the difference between both the videos exceeds the reference value in step S212, information that specifies a corresponding frame and a region is stored in the frame region storage module 117. Specifically, it is information such as a start address of a corresponding frame or start/end pixel coordinates of a corresponding MB region.

An example of a flow of a play back operation for the personal video according to the present invention will now be described with reference to FIG. 3. This embodiment is an example where an image showing a corresponding region is generated when play back a frame having a large difference in motion characteristic amount between the master video and the personal video in the frame region disclosure module 118, and such display as shown in a right screen in FIG. 6 is enabled.

In step S301, the MPEG processing module 106 decodes the personal video. In step S302, whether a start address of a current frame coincides with an address stored in step S213 in FIG. 2 is determined. Processing of steps S303 and S304 is performed only when these addresses coincide with each other.

That is, in step S303, an image such as a mark or a caption that suggests a region is generated with respect to the region information stored in step S213 in FIG. 2. In step S304, the image generated in step S303 is combined with an original image. In step S305, video and audio are output from the output module 107. In regard to the frame having a large difference in motion from the master video, a combined image generated in step S304 is output.

Another operation example will now be described with reference to FIG. 4. FIG. 4 shows an example of an automatic repetitive play back flow of the master video according to the present invention. This embodiment is an example where the frame region disclosure module 118 automatically repetitively reproduces a frame period having a large difference in motion characteristic amount between the master video and the personal video.

In step S401, the MPEG processing module 106 decodes the master video. In step S402, whether a start address of a current frame coincides with an address stored in step S213 in FIG. 2. Play back processing is executed in steps S403 to S407 only when these addresses coincide with each other.

That is, in step S403, in case of the top of a continuous frame period as a play back target, a start address value of a corresponding frame is stored as an entry point. In step S404, the output module 107 outputs video and audio of the current frame.

In steps S405 to S407, if the viewer issues an instruction to skip to the next continuous frame period repetitive play back, the entry point stored in step S403 is deleted. Further, if a play back end instruction is not issued from the viewer, the processing moves to step S401 to start decoding the next frame. When the play back end instruction is issued, the processing is terminated.

In steps S408 to S410, if the result of the determination in step S402 is NO and the entry point is not deleted, the processing returns to the entry point, i.e., the top of the continuous frame period as the play back target in step S409, and the repetitive play back is executed based on the processing in step S401 and the subsequent steps. If the entry point is not present, the processing skips to the next frame in step S410, and the skips continue until the continuous frame period as the play back target is found.

The present invention is not restricted to the foregoing embodiment. Means for selecting a first person who should be a comparison target in the master video and the personal video by the viewer may be added. For example, when a plurality of persons are present in the master video, a person as a comparison target may be selected in a screen in such a manner that it is surrounded by a dotted frame in FIG. 5.

Furthermore, it is possible to add means for automatically detecting a person on the master side having a motion characteristic amount similar to that in the personal image when the number of persons imaged in the personal video is one. In this case, even a plurality of persons are present in the master video, a comparison target can be automatically determined.

Moreover, means for determining a proficiency level of the viewer may be added so that play back content or a play back speed of the master video can be switched in accordance with a level.

Additionally, in the apparatus according to the present invention, the master video and the personal video may be partially positively zoomed in and compared to detect a difference in motion between these images. As a result, an image operation in a part of the master video can be accurately compared with that in a part of the personal video.

Figure 7:
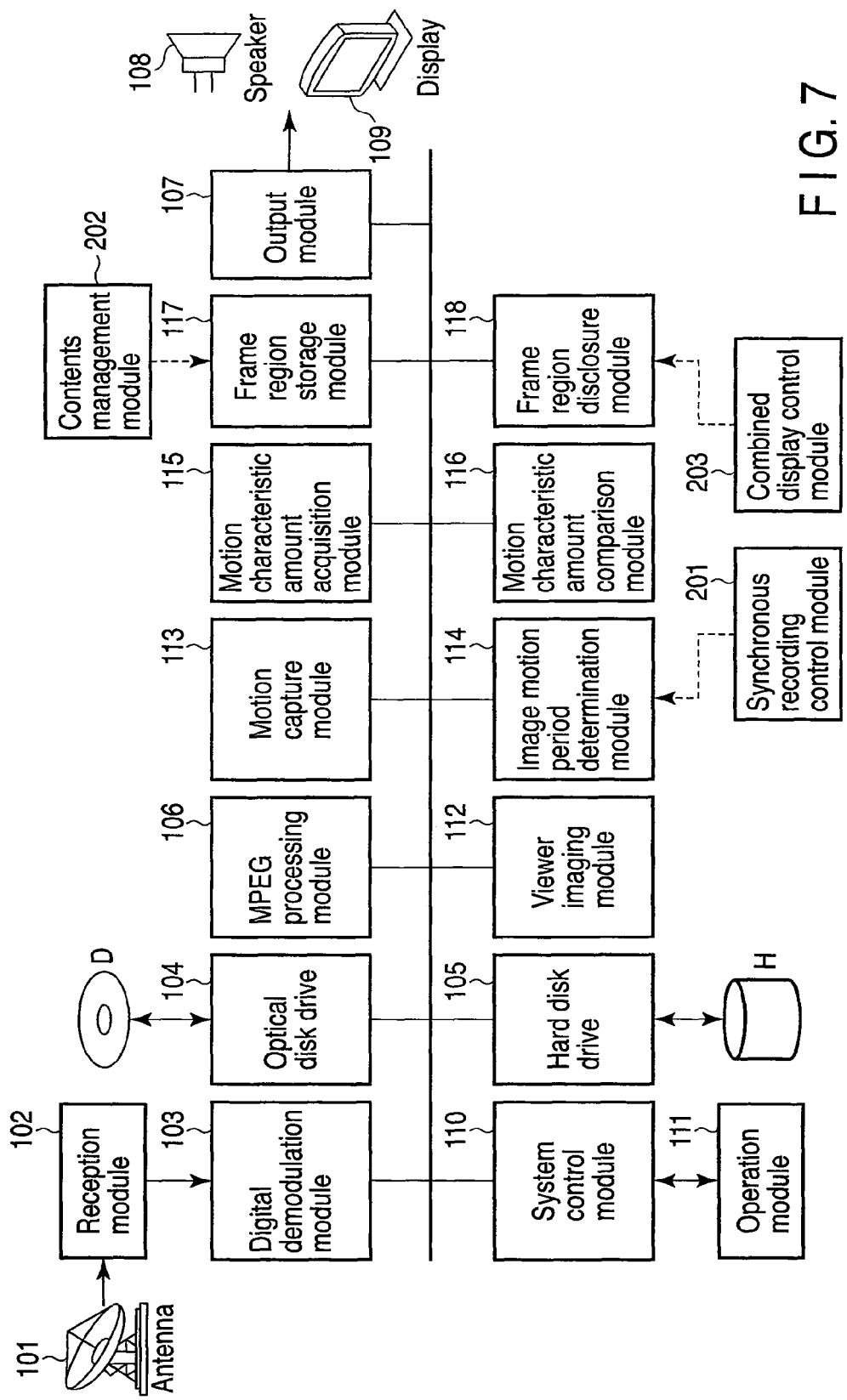
FIG. 7 is a view showing a configuration in another embodiment of the apparatus according to the present invention.

FIG. 7 shows a configuration of another embodiment of the apparatus according to the present invention. A synchronous recording control module 201, a content management module 202, and a combined display control module 203 are additionally shown with respect to the configuration depicted in FIG. 1. The synchronous recording control module 201 may be independently provided, but it is provided in an image motion period determination module 114. Further, the content management module 202 is provided in a frame region storage module 117. Furthermore, the combined display control module 203 is provided in a frame region disclosure module 118.

The synchronous recording control module 201 holds, e.g., play back time information in the form of a presentation time stamp (PTS) of a master video and uses this information as a synchronous signal when recording a personal video. Furthermore, at this time, the content management module 202 manages information such as a content ID in order to associate the master video with the personal video. When simultaneously play back a viewer video and the master video, the content management module 202 retrieves associated content, then the combined display control module 203 determines display regions of a plurality of pieces of content as play back targets, and an output module 107 executes control for combined display.

Figure 8:
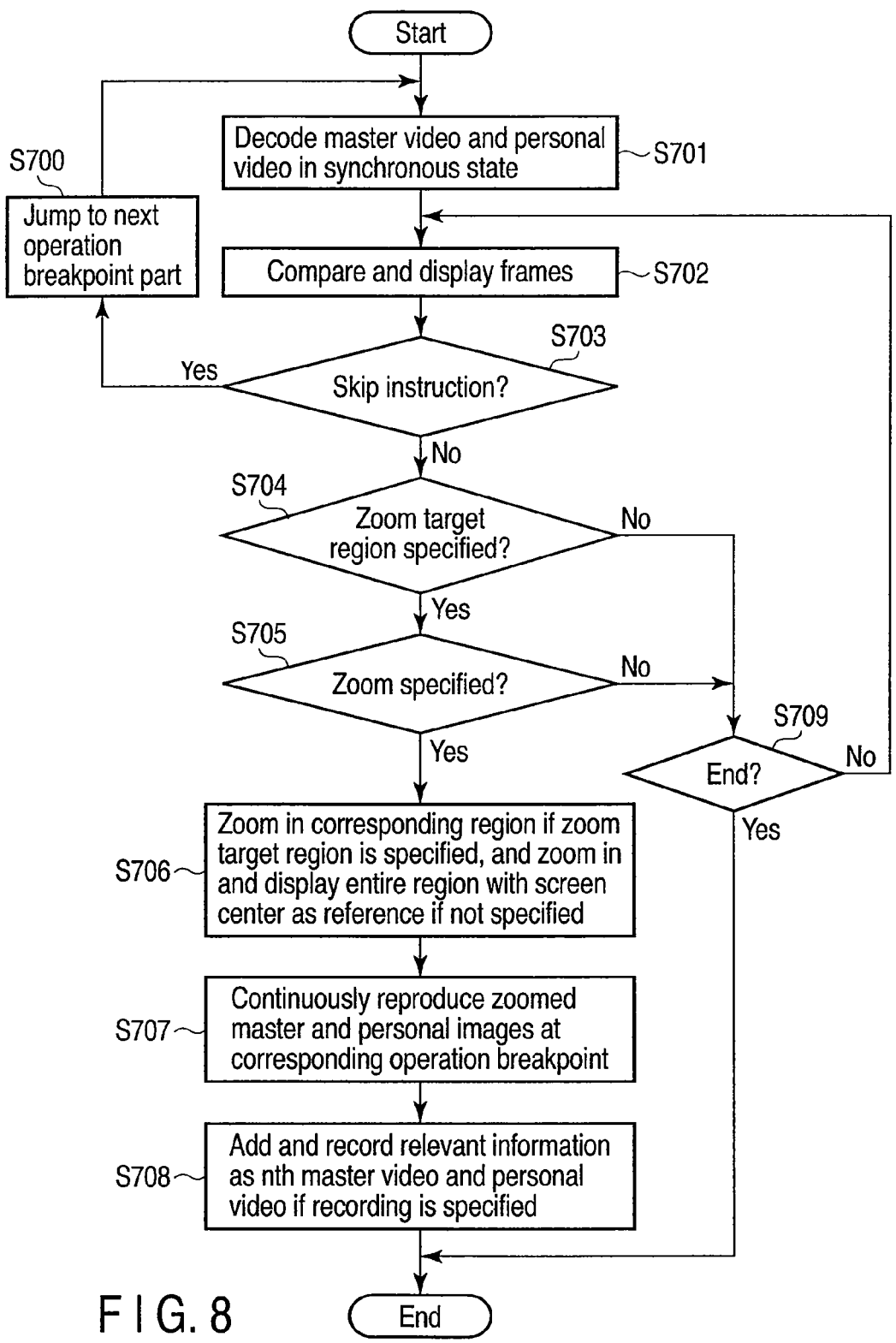
FIG. 8 is a flowchart for explaining an operational example of the apparatus depicted in FIG. 7.
Figure 9A:
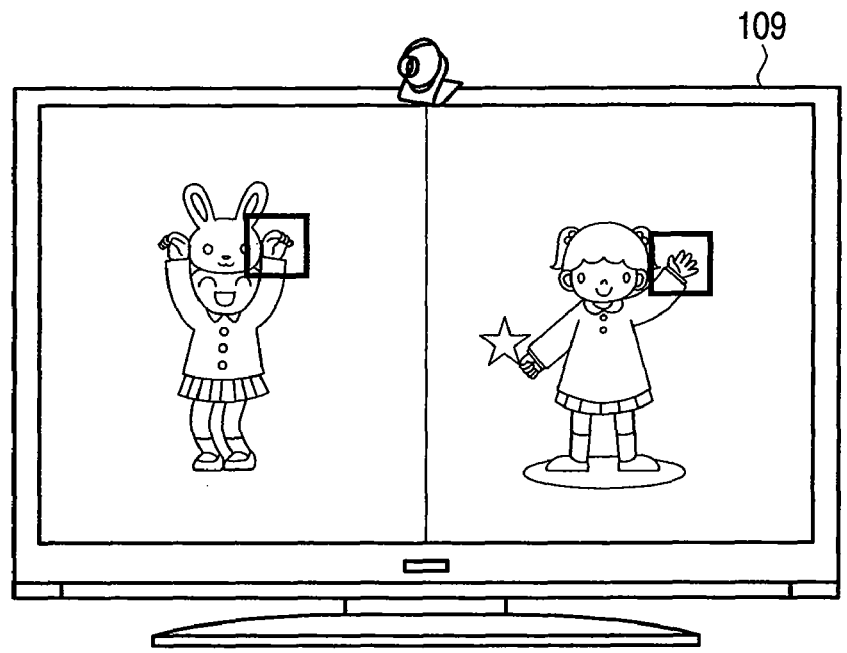
FIGS. 9A and 9B are views showing display examples of the display module when the apparatus depicted in FIG. 7 operates.
Figure 9B:
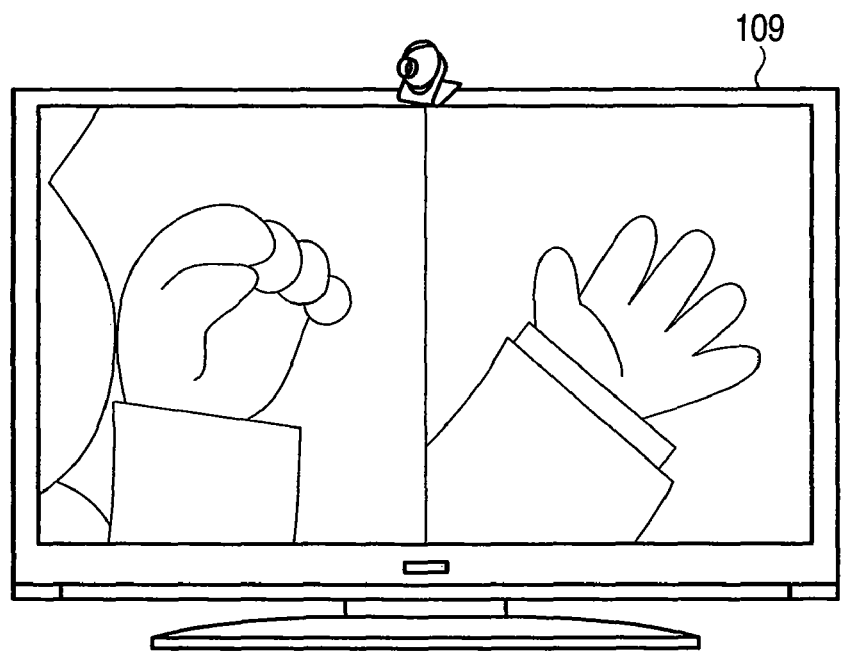

FIG. 8 is a flowchart for explaining a characteristic operation of the apparatus depicted in FIG. 7. In this flowchart, for example, activation is performed in a personal video editing mode, and a frame region disclosure module 118 mainly operates. In steps S701 and S702, a master video and a personal video recorded in a recording medium are simultaneously reproduced based on a processing procedure depicted in FIG. 2 and they are displayed in a display 109 based on an operation of the combined display control module 203 (FIG. 9A). If a skip instruction is issued in step S703, the processing jumps to the next image motion period, thereby obtaining a frame comparison state of the master video and the personal video in this period. In step S704, if a zoom target region is specified as indicated by a square frame in, e.g., FIG. 9A, a corresponding region is zoomed in and displayed as depicted in FIG. 9B (steps S705 and S706). Moreover, the master video and the personal video in the corresponding image motion period part are continuously reproduced in the zoomed state (step S707). Here, if recording (or saving) is not specified, the master video and the personal video compared in the zoomed state are saved in the recording medium as videos concerning the master video. At this time, the content management module 202 manages the master video and the personal video subjected to zooming processing as nth management videos.

It is particularly effective to realize the present invention as an application in a video viewing apparatus such as a cell television suitable for image processing based on intensive arithmetic performance. This video viewing apparatus can greatly expand utilization as part of entertainment, e.g., realization of more efficient home training or automation of home video editing which is difficult for general users in conventional examples.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video viewing apparatus comprising:
   an image module configured to image a personal video in which a viewer is imaged, the viewer watching a master video;
   an image motion period determination module configured to determine, for each of the master video and the personal video, a continuous period of frames in which an image is moving as a breakpoint of a series of operations;
   a motion characteristic amount acquisition module configured to acquire motion characteristic amounts from image motion parts of individual frames in the frame period determined as the breakpoint of the series of operations;
   a motion characteristic amount comparison module configured to compare a motion characteristic amount of the master video with that of the personal video;
   a storage module configured to store information corresponding to a frame having a large difference in motion characteristic amount revealed by the comparison; and
   a disclosure module configured to reproduce the frames of the master video and the personal video based on the recorded information at the time of play back and output the reproduced frames to an output module, wherein the disclosure module generates an image which specifies a region of the image motion part when playing back the frame having the large difference in motion characteristic amount.

2. A video viewing apparatus comprising:
   an image module configured to image a personal video in which a viewer is imaged, the viewer watching a master video;
   an image motion period determination module configured to determine, for each of the master video and the personal video, a continuous period of frames in which an image is moving as a breakpoint of a series of operations;

a motion characteristic amount acquisition module configured to acquire motion characteristic amounts from image motion parts of individual frames in the frame period determined as the breakpoint of the series of operations;

a motion characteristic amount comparison module configured to compare a motion characteristic amount of the master video with that of the personal video;

a storage module configured to store information corresponding to a frame having a large difference in motion characteristic amount revealed by the comparison; and a disclosure module configured to reproduce the frames of the master video and the personal video based on the recorded information at the time of play back and output the reproduced frames to an output module, wherein the disclosure module automatically repetitively reproduces the frame having the large difference in motion characteristic amount.

3. A video viewing apparatus comprising:

an image module configured to image a personal video in which a viewer is imaged, the viewer watching a master video;

an image motion period determination module configured to determine, for each of the master video and the personal video, a continuous period of frames in which an image is moving as a breakpoint of a series of operations;

a motion characteristic amount acquisition module configured to acquire motion characteristic amounts from image motion parts of individual frames in the frame period determined as the breakpoint of the series of operations;

a motion characteristic amount comparison module configured to compare a motion characteristic amount of the master video with that of the personal video;

a storage module configured to store information corresponding to a frame having a large difference in motion characteristic amount revealed by the comparison; and a disclosure module configured to reproduce the frames of the master video and the personal video based on the recorded information at the time of play back and output the reproduced frames to an output module, wherein the storage module edits a scene having the large difference in motion characteristic amount to be automatically cut.

4. A video viewing apparatus comprising:

an image module configured to image a personal video in which a viewer is imaged, the viewer watching a master video;

an image motion period determination module configured to determine, for each of the master video and the personal video, a continuous period of frames in which an image is moving as a breakpoint of a series of operations;

a motion characteristic amount acquisition module configured to acquire motion characteristic amounts from image motion parts of individual frames in the frame period determined as the breakpoint of the series of operations;

a motion characteristic amount comparison module configured to compare a motion characteristic amount of the master video with that of the personal video;

a storage module configured to store information corresponding to a frame having a large difference in motion characteristic amount revealed by the comparison; and a disclosure module configured to reproduce the frames of the master video and the personal video based on the recorded information at the time of play back and output the reproduced frames to an output module, wherein the disclosure module outputs videos obtained by zooming in a part of the master video and a part of the personal video to a display module when playing back the frame having the large difference in motion characteristic amount.

5. A video play back control method configured to reproduce a master video recorded in a recording medium and a personal video obtained by imaging a viewer, who is watching the master video, by an imaging module based on a processing procedure by a control module, the method comprising:

playing back the master video and determining, for each of the master video and the personal video, a continuous period of frames in which an image is moving as a breakpoint of a series of operations;

acquiring motion characteristic amounts from image motion parts of individual frames in the period of frames determined as a breakpoint of a series of an operation;

comparing a motion characteristic amount of the master video with that of the personal video;

storing information corresponding to a frame having a large difference in motion characteristic amount revealed by the comparison; and playing back the frames of the master video and the personal video based on the stored information at the time of play back and displaying the frames to a display module, wherein an image which specifies a region of the image motion part is displayed when the frame having a large difference in motion characteristic amount is reproduced.

6. A video play back control method configured to reproduce a master video recorded in a recording medium and a personal video obtained by imaging a viewer, who is watching the master video, by an imaging module based on a processing procedure by a control module, the method comprising:

playing back the master video and determining, for each of the master video and the personal video, a continuous period of frames in which an image is moving as a breakpoint of a series of operations;

acquiring motion characteristic amounts from image motion parts of individual frames in the period of frames determined as the breakpoint of a series of an operation;

comparing a motion characteristic amount of the master video with that of the personal video;

storing information corresponding to a frame having a large difference in motion characteristic amount revealed by the comparison; and playing back the frames of the master video and the personal video based on the stored information at the time of play back and displaying the frames to a display module, wherein the frame having a large difference in motion characteristic amount is automatically repetitively reproduced.

7. A video play back control method configured to reproduce a master video recorded in a recording medium and a personal video obtained by imaging a viewer, who is watching the master video, by an imaging module based on a processing procedure by a control module, the method comprising:

playing back the master video and determining, for each of the master video and the personal video, a continuous period of frames in which an image is moving as a breakpoint of a series of operations;

acquiring motion characteristic amounts from image motion parts of individual frames in the period of frames determined as the breakpoint of a series of an operation;

comparing a motion characteristic amount of the master video with that of the personal video;

storing information corresponding to a frame having a large difference in motion characteristic amount revealed by the comparison; and playing back the frames of the master video and the personal video based on the stored information at the time of play back and displaying the frames to a display module, wherein videos obtained by zooming in a part of the master video and a part of the personal video are output to the display module when playing back the frame having a large difference in motion characteristic amount.

* * * * *